United States Patent
Pomeroy et al.

(10) Patent No.: US 7,286,923 B2
(45) Date of Patent: Oct. 23, 2007

(54) SYSTEM AND METHOD FOR ESTIMATING TURBINE ENGINE DETERIORATION RATE WITH NOISY DATA

(75) Inventors: Bruce Douglas Pomeroy, Duanesburg, NY (US); James Kenneth Aragones, Clifton Park, NY (US); Deniz Senturk Doganaksoy, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/240,995

(22) Filed: Sep. 30, 2005

(65) Prior Publication Data

US 2007/0078585 A1    Apr. 5, 2007

(51) Int. Cl.
G06G 7/70 (2006.01)
G06F 19/00 (2006.01)

(52) U.S. Cl. ............. 701/100; 700/287; 477/30; 60/239; 702/FOR. 113

(58) Field of Classification Search ........ 701/100, 701/101, 112; 700/287; 60/685, 597, 39.01, 60/900, 901, 39.52; 367/60; 73/1.02, 514.07
See application file for complete search history.

(56) References Cited

U.S. PATENT DOCUMENTS

| | | | | |
|---|---|---|---|---|
| 4,334,427 A | * | 6/1982 | Armstrong | 73/118.1 |
| 4,580,910 A | * | 4/1986 | Corwin | 374/144 |
| 5,018,069 A | * | 5/1991 | Pettigrew | 701/35 |
| 5,456,578 A | * | 10/1995 | Honda et al. | 415/214.1 |
| 6,216,066 B1 | * | 4/2001 | Goebel et al. | 701/29 |
| 6,606,580 B1 | | 8/2003 | Zedda et al. | 702/185 |
| 6,660,405 B2 | * | 12/2003 | Lau et al. | 428/613 |
| 6,962,043 B2 | * | 11/2005 | Venkateswaran et al. | 60/39.091 |
| 2002/0193933 A1 | * | 12/2002 | Adibhatla et al. | 701/100 |
| 2003/0054196 A1 | * | 3/2003 | Lau et al. | 428/655 |
| 2004/0172228 A1 | * | 9/2004 | Aragones | 703/8 |
| 2005/0021212 A1 | * | 1/2005 | Gayme et al. | 701/99 |
| 2005/0049832 A1 | * | 3/2005 | Gorinevsky | 702/182 |
| 2005/0261820 A1 | * | 11/2005 | Feeney et al. | 701/100 |

* cited by examiner

Primary Examiner—Thomas Black
Assistant Examiner—Jorge O. Peche
(74) Attorney, Agent, or Firm—Fletcher Yoder

(57) ABSTRACT

A method for monitoring engine performance includes sampling exhaust gas temperature associated with a turbine engine over an interval of operational time of the turbine engine. The method further includes applying a first test to identify statistical outliers on the sampled exhaust gas temperature data and removing identified statistical outliers from the sampled exhaust gas temperature data. Subsequently, the method includes applying a second test to identify step changes in slope of the exhaust gas temperature data and dividing the interval of operational time into one or more segments based upon the identified step changes. Finally, the method includes determining a slope for each segment and combining the segments to obtain a rate of performance deterioration of the turbine engine.

21 Claims, 16 Drawing Sheets

SYSTEM AND METHOD FOR ESTIMATING TURBINE ENGINE DETERIORATION RATE WITH NOISY DATA

BACKGROUND

The invention relates generally to turbine engines and, particularly, to estimating turbine engine deterioration rates with noisy data. Specific embodiments of the present technique provide systems and methods for estimating engine deterioration rates for single engine in a fleet and average deterioration rates for a fleet of engines.

There are many benefits to understanding deterioration characteristics in a turbine engine. For example, for a commercial aircraft engine, the management of long term service agreements depends on the ability to accurately forecast overhauls, which is highly dependent on performance deterioration. Better knowledge of deterioration characteristics also improves engine fault diagnostic capability by tightening alert thresholds. Finally, knowledge about the drivers of deterioration characteristics in current designs is used in developing future engines.

A variety of engine performance variables, such as engine exhaust gas temperature (EGT), can be analyzed to estimate engine deterioration. Unfortunately, estimation of engine deterioration rate (also referred to as DetRate) is complicated by several types of defects in the raw data caused by a variety of factors such as sensor calibration shifts, water-wash events, etc. Such defects may include, for example, statistical outliers, step changes in the performance variable, and large X-range gaps (i.e. time gaps).

The current approach for estimating the deterioration rate of a single engine uses a linear regression technique. However, this method disadvantageously assigns a single slope to the entire dataset and, hence, does not mitigate outliers and large X-range gaps in the data. For a fleet of engines, the current approach involves dividing the time scale into segments and manually selecting from the estimated individual engine deterioration rates those that seem reasonable. The selected deterioration rates of individual engines are then combined within each segment to obtain the fleet average. A disadvantage of this method is that it provides no estimate for the error in the average deterioration rate of the fleet.

Accordingly, there is a need for an improved system and method to estimate engine deterioration rates for single engine as well as average deterioration rates for a fleet of engines.

BRIEF DESCRIPTION

Briefly, in accordance with one aspect, a method for monitoring performance of a turbine engine is provided. The method includes sampling exhaust gas temperature data associated with a turbine engine over an interval of operational time of the turbine engine. The method further includes applying a first test to identify statistical outliers on the sampled exhaust gas temperature data and removing identified statistical outliers from the sampled exhaust gas temperature data. Subsequently, the method includes applying a second test to identify step changes in slope of the exhaust gas temperature data and dividing the interval of operational time into one or more segments based upon the identified step changes. Finally, the method includes determining a slope for each segment and combining the segments to obtain a rate of performance deterioration of the turbine engine.

In another aspect, a system for monitoring turbine performance is provided. The system includes sensors adapted to sense exhaust gas temperature of one or more turbine engines; and sensors adapted to sense exhaust gas temperature of one or more turbine engines. The system further includes a performance deterioration rate monitoring system configured for identifying and eliminating statistical outliers and step changes from sensed exhaust gas temperature data of individual turbine engines and determining the occurrence of an X-range gap in said exhaust gas temperature data of individual turbine engines to obtain a rate of change of exhaust gas temperature for each turbine engine therefrom.

In still further aspects, computer programs and routines are provided comprising code adapted to implement the above described functionality.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
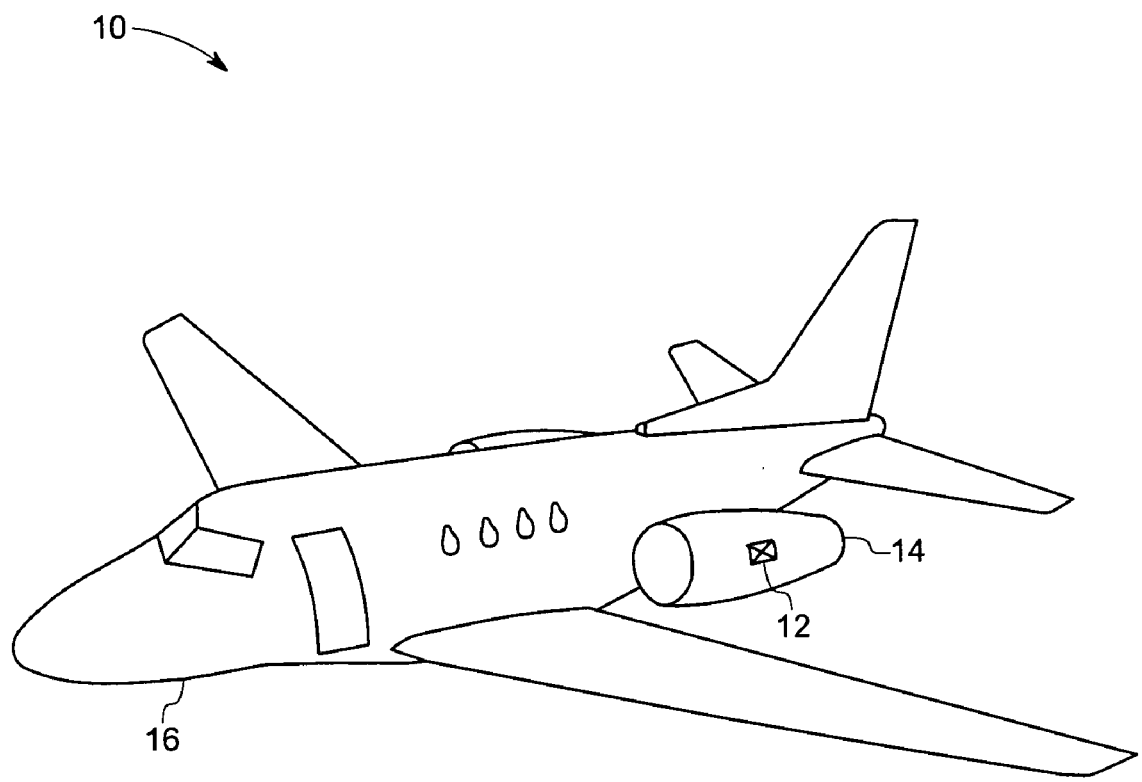
FIG. 1 is a schematic diagram illustrating an aircraft embodying aspects of the present technique.

As discussed in detail below, embodiments of the present technique function to provide a novel and accurate estimation of turbine engine deterioration rate with noisy data. An exemplary application of the present technique is an aircraft engine. However, the disclosed embodiments may be incorporated or retrofitted into a variety of engines, such as internal combustion engines, compression ignition engines (e.g., diesel engines), turbine engines, and so forth. Moreover, the disclosed embodiments may be incorporated or retrofitted into a variety of systems, such as watercraft, automobiles, locomotives, power generation systems, and so forth. Referring now to the drawings, FIG. 1 illustrates an aircraft 10 having an engine performance deterioration rate monitoring system 12 disposed in an aircraft engine 14 coupled to a body or frame 16 of the aircraft 10. In the illustrated embodiment, the aircraft 10 comprises a plurality of engines 14, such as gas turbine engines. In certain embodiments, the system 12 is coupled to a plurality of engines 14 in a fleet of aircraft 10. The engine performance deterioration rate monitoring system 12 is configured for estimating performance deterioration rates of single engine in a fleet of engines and further combining these individual engine performance deterioration rates into an average performance deterioration rate for the fleet, as will be described in detail below generally referring to FIGS. 2-17. For example, the system 12 reduces or substantially removes a variety of noise (e.g., data outliers, gaps, steps, etc.) in engine data, and improves the estimation of engine deterioration.

Figure 2:
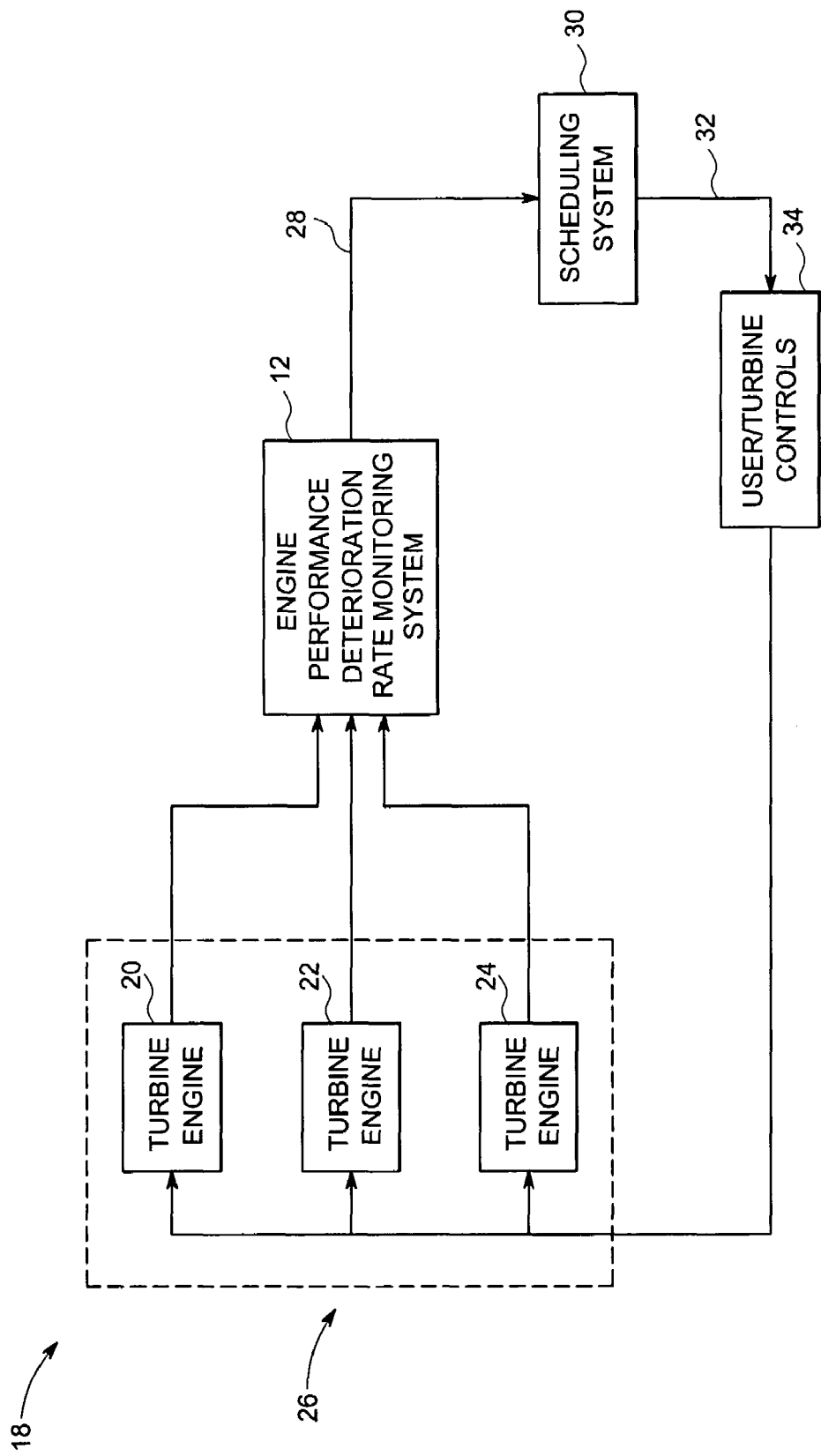
FIG. 2 is block diagram of a turbine engine monitoring system according to aspects of the present technique.

Turning now to FIG. 2, a block diagram illustrates a system 18 for monitoring an aircraft engine in accordance with one embodiment of the present technique. In the illustrated embodiment, the engine performance deterioration rate monitoring system 12 is coupled to a plurality of turbine engines 20, 22, 24 in a fleet 26. In certain embodiments, the system 12 may monitor and collect data for a variety of engine variables relating to deterioration in engine performance. One such variable is engine exhaust gas temperature (EGT), during both the take-off and cruise phases of each flight. The engine performance deterioration rate monitoring system 12 may accordingly include sensors adapted to measure EGT and/or other parameters associated with performance deterioration of the engines 20, 22, 24. In accordance with the present technique, the engine performance deterioration rate monitoring system 12 is configured to utilize the sensed data to estimate performance deterioration rates of each engine 20, 22, 24 in the fleet 26 and to combine these individual engine performance deterioration rates into a fleet average by eliminating noise in the EGT data to identify trends in engine EGT. As described in detail below, identifying trends in EGT includes identification and elimination of statistical outliers, steps, and large X-range gaps from the EGT data.

Output 28 of the engine performance deterioration rate monitoring system 12 comprises average and individual rates of engine performance deterioration and may include, for example a graphical representation of EGT trends for individual engines 20, 22, 24 and for the fleet 26. The fleet 26 may include one or more aircrafts 10. In other words, the fleet 26 may correspond to a single aircraft 10 having multiple engines 20, 22, and 24, or the fleet may correspond to a fleet of aircraft 10 each having one or more engines 20, 22, and 24. Engine performance deterioration rate is generally correlated with the slope of the estimated EGT trend. In certain embodiments, the engine performance deterioration rate monitoring system 12 includes a computer with special data processing software, which functions to identify trends from sensed EGT data as discussed above and to forecast a desired engine downtime when a preselected critical level of engine deterioration has been reached.

In certain embodiments, output 28 of the engine performance deterioration rate monitoring system 12 may include an engine shutdown forecast signal that may be coupled to a scheduling system 30, which is operable to schedule downtime for the fleet 26. For example, the scheduling system 30 may function to schedule repairs, replacement, servicing, or maintenance on the engines 20, 22, 24 (or one or more aircraft 10) based on one or more forecasts points, e.g., increasing levels of engine deterioration eventually reaching a critical level indicating a need for an engine overhaul or replacement. In certain embodiments, the critical level may correspond to a selected or target deterioration level that substantially maximizes the useful life of the engines 20, 22, and 24, while also reducing downtime and minimizing performance problems with the engines 20, 22, and 24 and the one or more associated aircraft 10. The scheduling system 30 also may communicate scheduling information or commands 32 to the user controls and/or turbine controls 34 on the aircraft to ensure proper attention to the forecasts. These commands 32 also may command the aircraft to remain grounded upon reaching a certain level of engine deterioration, thereby ensuring that the one or more engines 20, 22, or 24 are serviced or replaced before the aircraft is taken to flight again. For example, the scheduling system 30 may be operable to create one or more notifications, engine maintenance/repair schedules, or absolute downtime depending on increasing levels of engine deterioration, as estimated by the system 12. In this manner, the system 30 may give notice and repetitive reminders leading up to one or more increasingly important scheduled times for general maintenance, service, repair, overhaul, or replacement of one or more of the engines 20, 22, or 24.

Figure 3:
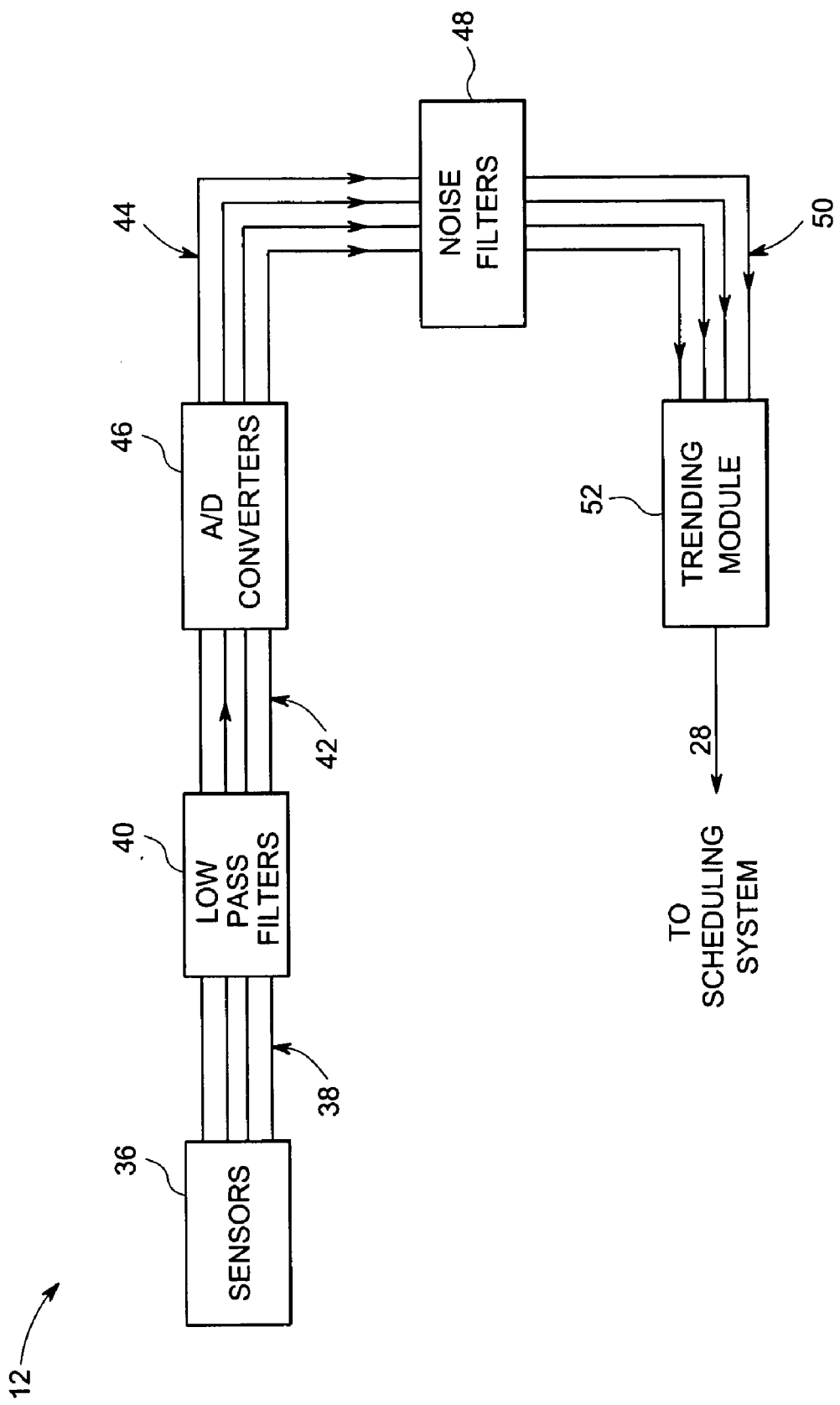
FIG. 3 is a block diagram of an engine performance deterioration monitoring system according to aspects of the present technique.

FIG. 3 illustrates a block diagram of an engine performance deterioration rate monitoring system 12 according to a specific embodiment of the present technique. In the illustrated embodiment, the engine performance deterioration rate monitoring system 12 includes sensors 36 adapted to measure engine exhaust gas temperature (EGT) and/or other variables associated with the engine performance deterioration, such as fuel consumption or the like. Measurement signals 38 from the sensors 36 may be passed through low pass filters 40 to eliminate anomalously large signals. In one embodiment, the low pass filters 40 may include anti-alias filters. The low pass filtered signals 42 are then converted into digitized data 44 via analog to digital (A/D) converters 46. The digitized signals 44 may be further passed through digital noise filters 48 to mitigate noise and errors associated with the digital data 44. In an exemplary embodiment, noise filters 48 may include median filters to remove anomalous data points from the digital data 44. The filtered digital data 50 is then utilized by a trending module 52, which is configured to identify trends in the exhaust gas temperature for subsequent analysis of engine deterioration for individual engines and the fleet average. As discussed in greater detail below, the trending module 52 may incorporate algorithms or computer readable instructions adapted to reduce noise in digitized EGT data by identifying and eliminating statistical outliers, steps, and large X-range gaps from the EGT data.

For estimating single engine deterioration rate, the present technique applies regression and smoothing algorithms on the sensed EGT data to identify trends in the EGT data plotted against a given interval of operational time of the engines, typically the number of flight cycles or hours of operation. In the embodiments illustrated, a Loess regression technique (a statistical smoothing technique also known as local regression) is utilized to estimate a smoothed value of a dependant variable, Y (referred to as Y fit), or a smoothed value of the slope dY/dX (referred to as dY/dX fit). In the illustrated embodiment, the dependant variable Y represents the sensed exhaust gas temperature (EGT), the independent variable X represents time, and the slope dY/dX represents a rate of change of EGT, which, in turn, is directly correlated with engine performance deterioration. The degree of smoothing in local regression is controlled by two parameters, namely the span and the degree of the regression. Span refers to the width of the local regression moving window, expressed in percentage of points in the dataset. For example, a larger span includes more points in the local averaging, and leads to greater damping-out of local noise effects. Degree of the regression refers to the degree of the polynomial used for the local fit, and controls the flexibility of the smoothing model. For example, a linear curve (degree=1) is more stiff than a quadratic curve (degree=2).

Figure 4:
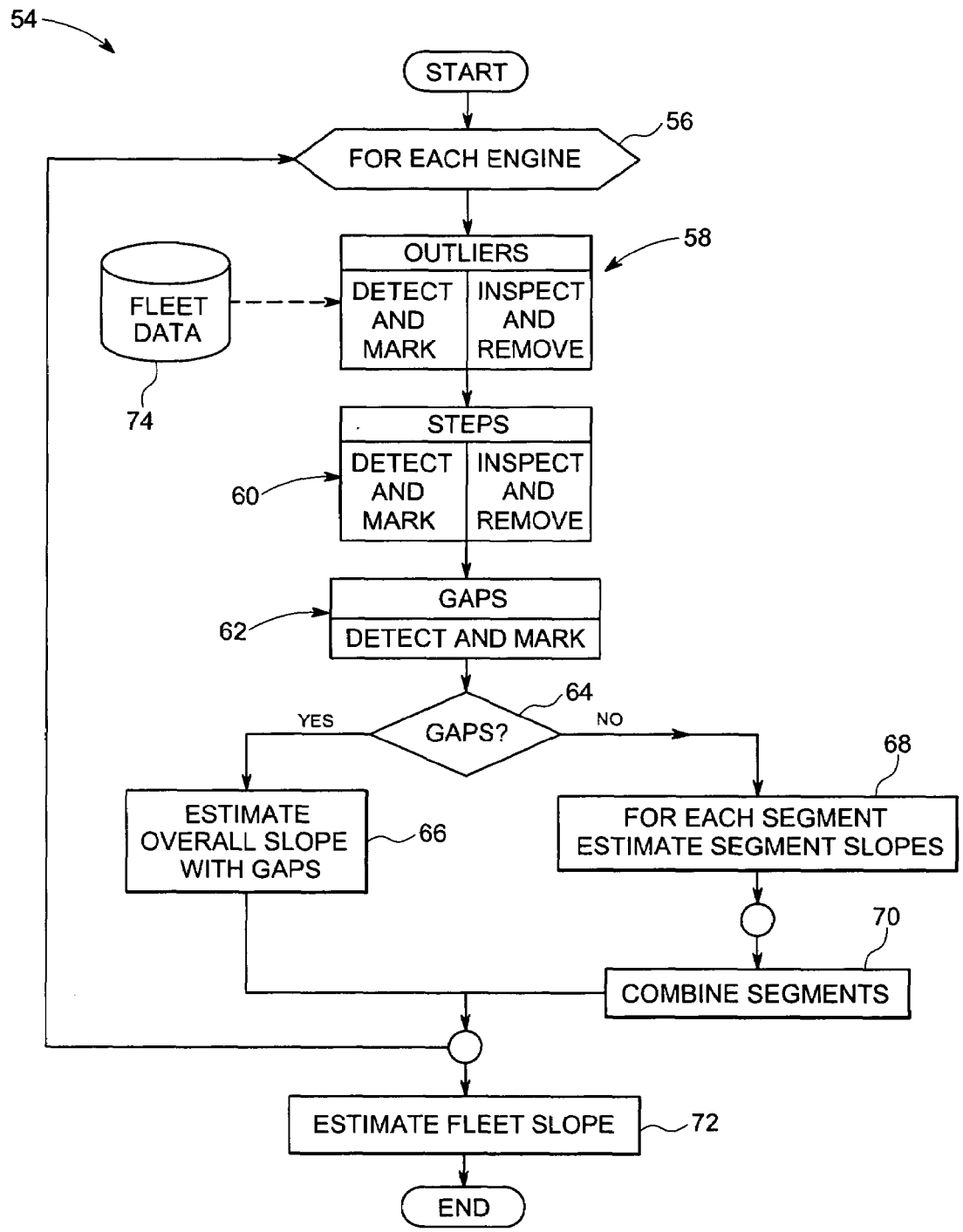
FIG. 4 is a flowchart illustrating an exemplary method for estimation of performance deterioration rate according to aspects of the present technique.

FIG. 4 is a flowchart illustrating an exemplary method 54 for estimation of performance deterioration rate according to aspects of the present technique. The method 54 includes estimating deterioration rates for each individual engine, as represented by step 56. At block 58, statistical outliers are identified and removed from the Loess fitted data. The removal of outliers improves the subsequent data processing, for example, because the Loess smoother used in step detection may be influenced by extreme value data points. Hence, it is desirable to detect and exclude these outliers. Outliers, once identified, may be eliminated manually or automatically via appropriate hardware and software. Block 58 is described in greater detail in a latter section referring to FIG. 5. Curves with steps often have useful deterioration rate information in the segments between the steps. Hence, before estimating the deterioration rate, it is desirable to detect these steps and separate the data into its useful segments. Accordingly, at block 60, step changes in slope of the EGT data are identified and removed. Block 60 is described in greater detail with reference to FIG. 9 below.

If, after step detection, questionable data segments are removed manually, then the resulting dataset may have large X-range gaps (i.e. time gaps). In such datasets, the useful deterioration rate information often lies in the centroids of the remaining point clusters and the X distance between them, and not within the clusters themselves. Accordingly, at block 62, X-range gaps are detected as explained in more detail with reference to FIG. 15. If at block 64, an X-range gap is identified, an overall slope with gaps is estimated at block 66. If no gap is detected, then for each segment identified in block 60, a segment slope is estimated (block 68). Individual segment slopes are then combined at block 70 to obtain a trend in EGT data for the particular engine. The above steps are then repeated for each engine to obtain an average deterioration rate for the fleet at block 72, utilizing fleet data 74.

Figure 5:
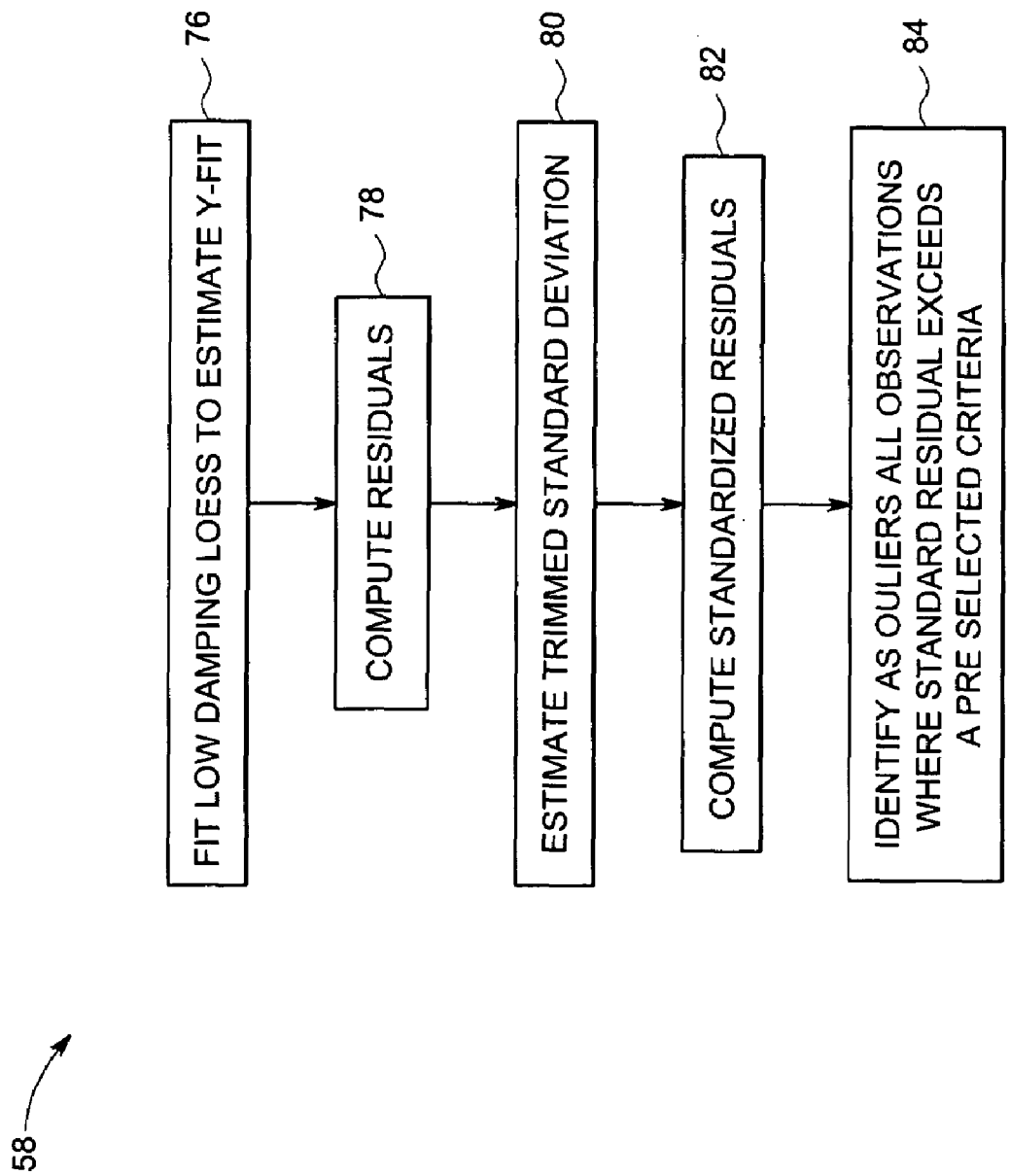
FIG. 5 is a flowchart illustrating an exemplary method for identification of statistical outliers in exhaust gas temperature (EGT) data according to aspects of the present technique.

FIG. 5 is a flowchart illustrating an exemplary test 58 for identification of statistical outliers in exhaust gas temperature (EGT) data according to aspects of the present technique. The test 58 includes fitting a low-damping Loess regression curve to estimate a trend line or Y fit. Residuals around this trend line are computed and the largest are marked as statistical outliers. The method 58 is illustrated by blocks 76-84. At block 76, a low damping Loess regression is utilized to estimate the Y fit. In the illustrated embodiment, the low damping Loess fit comprises a span of 5% and a degree of 1. In other embodiments, the fit may utilize other degrees and spans, such as a polynomial of an nth degree and a span of a desired percentage (e.g., 1-15%) about the nth degree polynomial. At block 78, residuals or errors are computed along the Y fit line. An error is computed as the difference between an actual data point ($Y_{DATA}$) and the corresponding value on the Y fit ($Y_{FIT}$). At block 80, a trimmed standard deviation is estimated for the residuals. In an exemplary embodiment, the trimmed standard deviation (SD trim) includes a standard deviation of the lowest 90% of the residuals. Computing standard deviation with all of the residuals allows the outliers to artificially inflate the estimate of noise. Hence, using the lowest 90% of residuals in standard deviation advantageously reduces this bias, and produces a more robust estimate. Next, at block 82, standardized residuals (Z resid) are determined for each point. In the illustrated embodiment, a standard Shewhart-style detector is implemented for special cause events around an expected mean of zero. Accordingly, the standard residual for each point is computed as:

$$Zresid = \frac{(\text{residual} - 0)}{SDtrim}$$

where trimmed standard deviation is estimated by:

SD trim=standard deviation(lowest 90% of residuals).

Utilizing these standard residuals, outliers are identified for all observation points where the standard residual exceeds preselected criteria (block 84). In the illustrated embodiment, outliers are identified as observation points where the modulus or absolute value of the standard residual exceeds 3, i.e. when |Z resid|>3. Statistical outliers, once identified, are subsequently removed from the data set.

Figure 6:
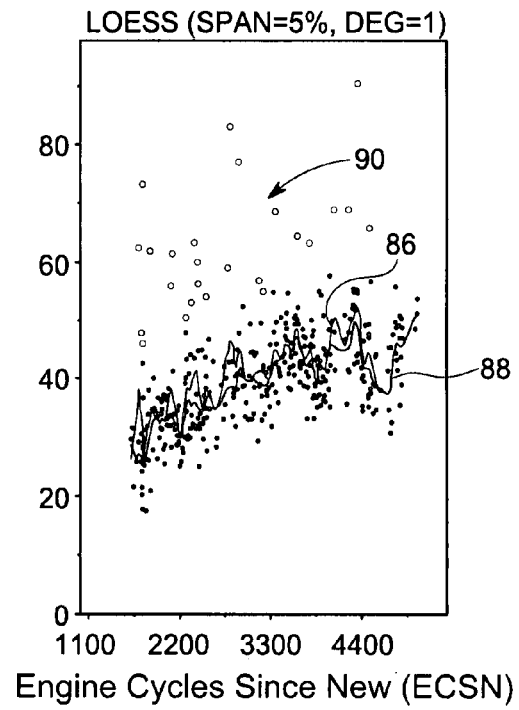
FIG. 6 is a graphical representation illustrating application of a Loess regression Y-fit to identify outliers in EGT data according to aspects of the present technique.
Figure 7:
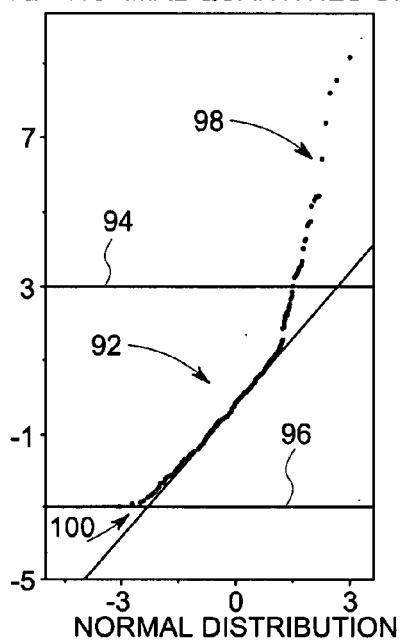
FIG. 7 is a graphical representation illustrating outlier detectors on a plot of standardized residuals from the Y-fit of FIG. 6.
Figure 8:
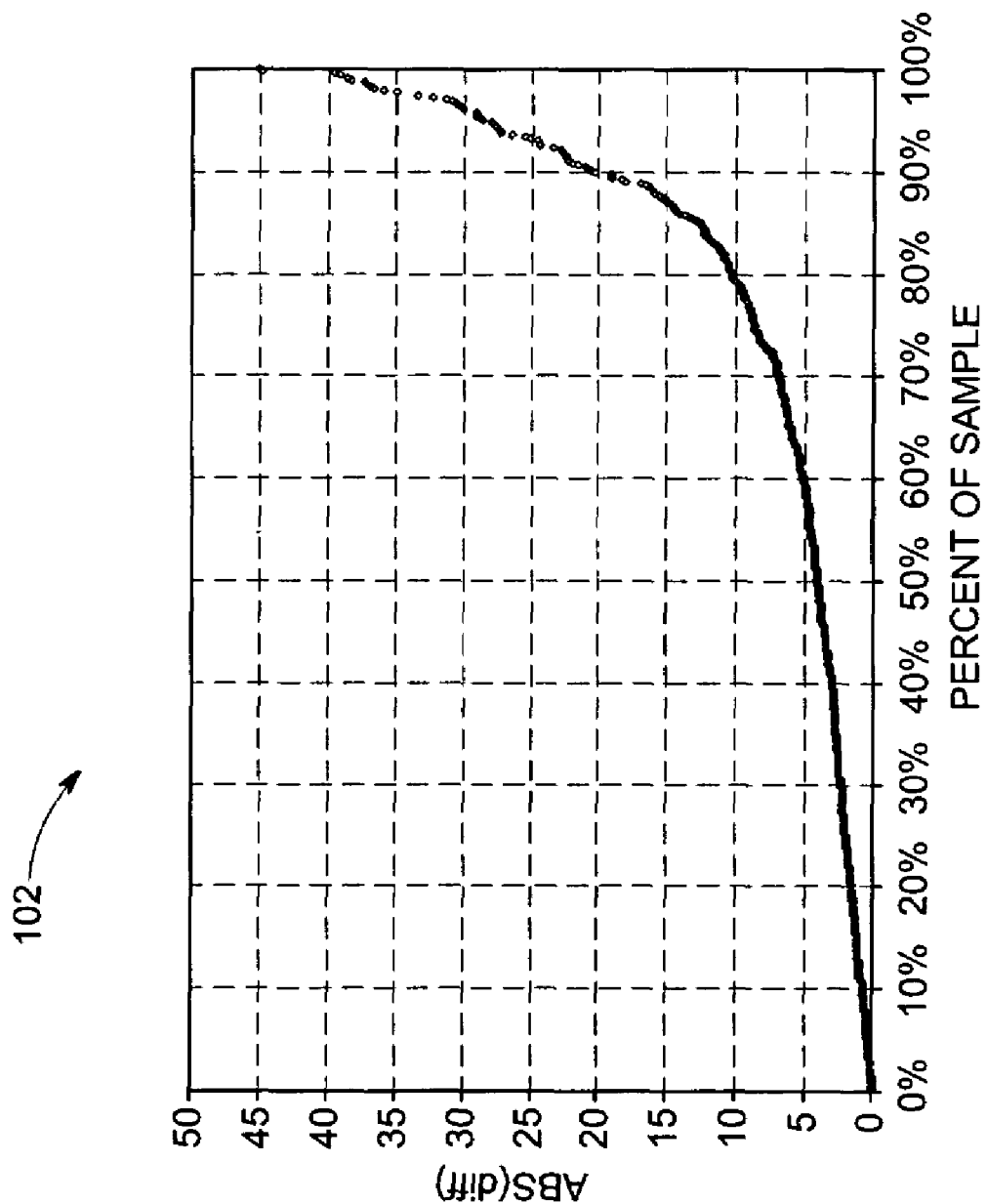
FIG. 8 is a graphical representation showing residuals plotted in order of absolute magnitude, illustrating advantages of using a 90% limit for trimming standard deviation according to aspects of the present technique.

FIG. 6 is a graphical representation illustrating application of the above method to an exemplary data set for a particular turbine engine. In the figure, trace 86 represents a Y fit to all sensed EGT data while trace 88 represents a Y fit once identified outliers 90 have been removed from the data set. FIG. 7 shows an exemplary plot 92 of the standard residuals (Z resid) illustrating outlier detectors 94 and 96. Points 98 and 100 above and below the detectors 94 and 96 are identified as statistical outliers. FIG. 8 shows a plot 102 of the residuals in order of their absolute magnitude, and illustrates the advantages of using a 90% limit as the cut-off for trimming the standard deviation as explained above. Computing standard deviation (SD) with all of the residuals allows the outliers to artificially inflate the estimate, whereas using only the lowest 90% of residuals in standard deviation reduces this bias, and produces a more robust estimate.

Figure 9:
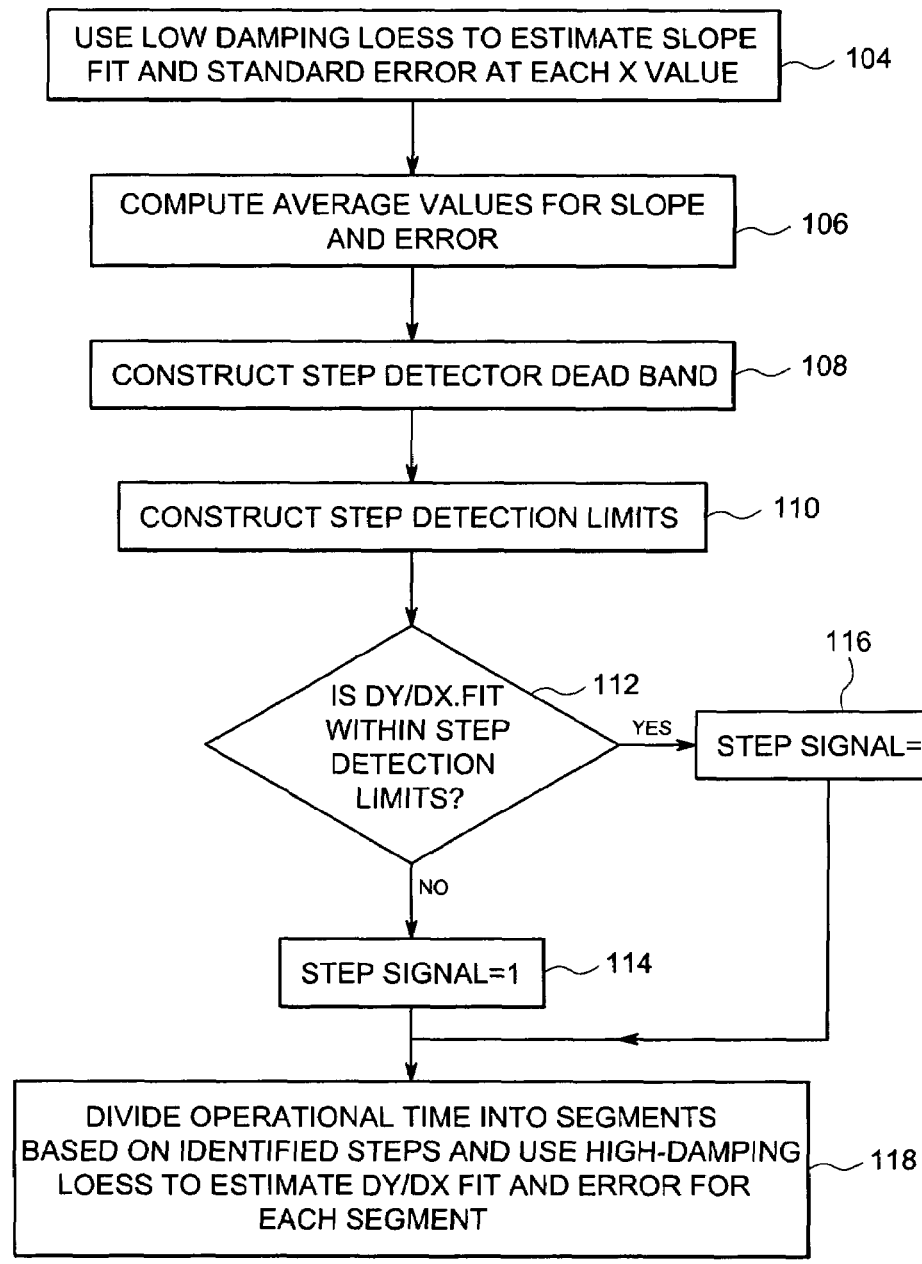
FIG. 9 is a flowchart illustrating an exemplary method for identification of step changes in slope in EGT data according to aspects of the present technique.

FIG. 9 is a flowchart illustrating an exemplary method 60 for identification of step changes in slope in EGT data according to aspects of the present technique. The method 60 incorporates a low damping Loess regression technique to estimate a slope of the fitted curve (referred to as dY/dX fit) and is configured to identify steps by their larger-than-average slopes. Exemplary steps of the method 60 are discussed in detail below.

At block 104, a low damping Loess regression is utilized to estimate a dY/dX fit and to determine a standard error (dY/dX·se) at each X value (i.e., at each observation time). Block 106 includes computation of average slope (dY/dX·avg) and average error (dY/dX·err). The average slope (dY/dX·avg) comprises an averaged value of the dY/dX fit while the average error (dY/dX·err) comprises an averaged value of the standard errors (dY/dX·se) at each X value. Utilizing the average slope (dY/dX·avg), a step detector dead band is constructed comprising an upper band limit (UBL) and a lower band limit (LBL) at block 108. The dead band mathematically expresses the judgment that slope changes within a certain multiple of the average slope may not be considered step changes. In the illustrated example, the step detector dead band limits are computed as given by the following relationships:

Upper band limit(UBL)=2*$dY/dX$.avg

Lower band limit(LBL)=0.5*$dY/dX$.avg     (1)

In the illustrated embodiment, the choice of the factors 2 and 0.5 indicates that slope changes within a factor of 2 of the average slope may be rejected. In certain other exemplary embodiments, other suitable values for the factors may be considered.

From the step detector dead band limits, actual step detection limits are constructed at step 110 comprising an upper confidence limit (UCL) and a lower confidence limit (LCL). In the illustrated example, these limits are computed as Upper confidence limit(UCL)=UBL+3*$dY/dX$·err Lower confidence limit(LCL)=LBL−3*$dY/dX$·err Thus, in the example illustrated, if there were no errors, then the detector dead-band would admit slope variations within the range 50% to 200% of the average slope. Errors cause us to be less certain that a slope observation outside the dead-band is, in fact, a step change. The range of this uncertainty in this example is chosen to be three standard errors on either side of the dead-band. Any observation that lies beyond this {UCL, LCL} band is marked as part of a step change in slope. Accordingly, at block 112, a check is made to determine whether the dY/dX fit at a particular X value is within the step detection limits. If that is not the case, i.e., if [dY/dX·fit>UCL] or [dY/dX·fit <LCL] then a step signal is assigned a value of 1 at block 114. If the dY/dX fit falls within the step detection limits, the step signal is assigned a value of 0 at block 116.

Figure 10:
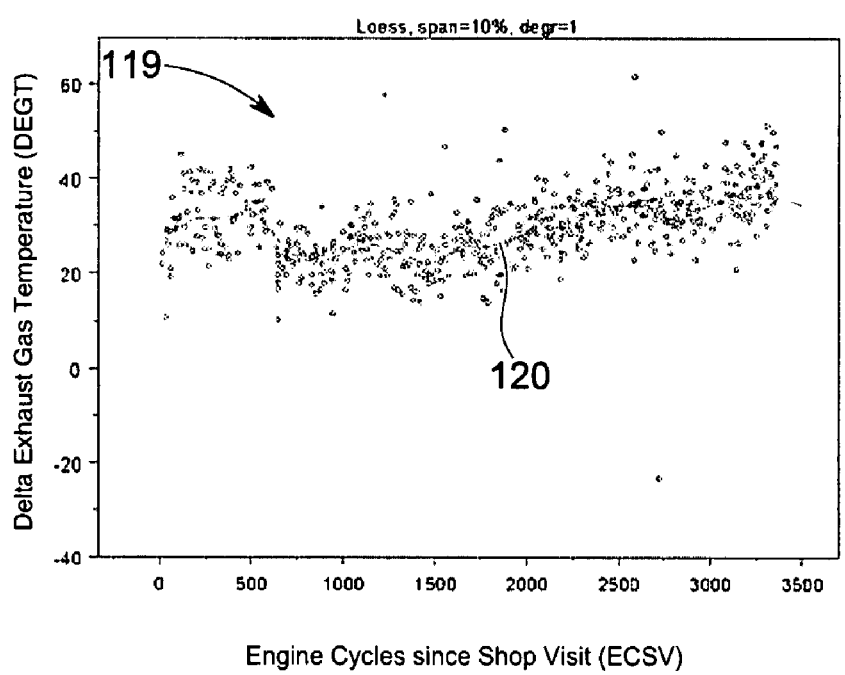
FIG. 10 is a graphical representation illustrating an exemplary plot of EGT data with step changes in slope according to aspects of the present technique.
Figure 11:
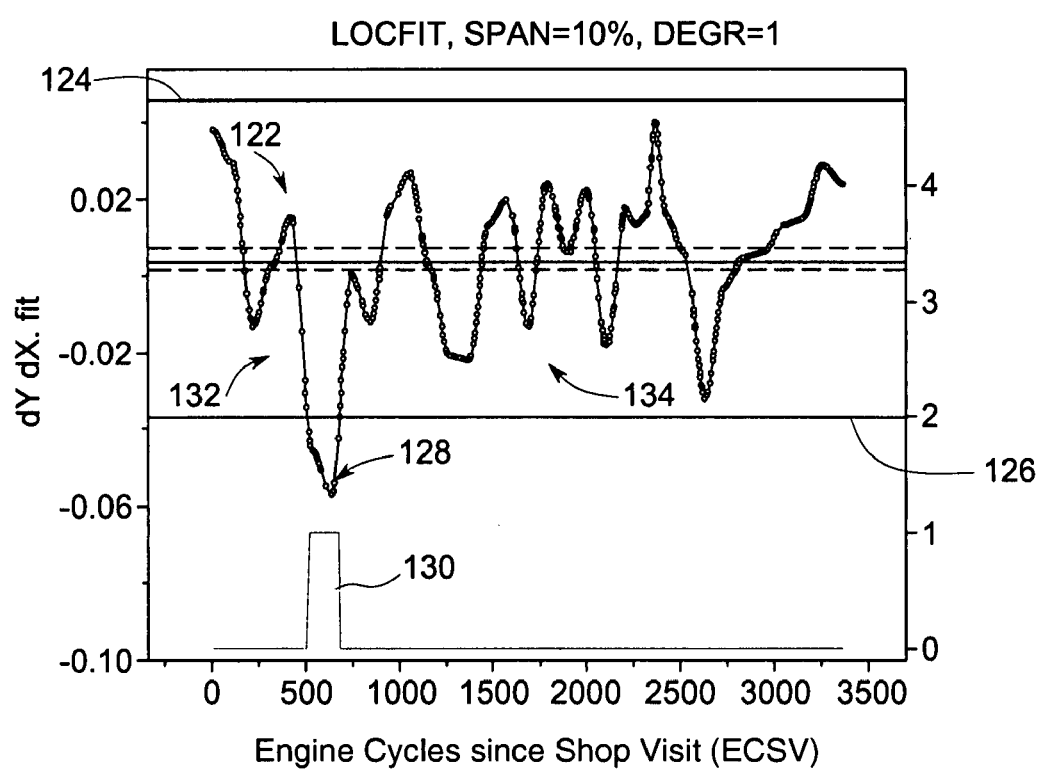
FIG. 11 is a graphical representation illustrating a step-detector in accordance with aspects of the present technique.

FIG. 10 is a graphical illustration of an exemplary plot 119 of EGT data of a particular engine wherein aspects of the present technique are applicable. The Y fit of the plot 119 is represented by a trace 120. FIG. 11 shows a slope fit or dY/dX fit 122 of the plot 119 of FIG. 10. The figure also illustrates the upper and lower step detection limits 124 and 126 that are determined at block 110 in FIG. 9. Trace 130 illustrates the step signal. As illustrated, the step signal 130 attains a value of 1 for points 128 where the dY/dX fit falls beyond the step detection limits points, which is marked as a step change in slope. In the illustrated example, this step change in slope divides the dataset into two segments 132 and 134.

Figure 12:
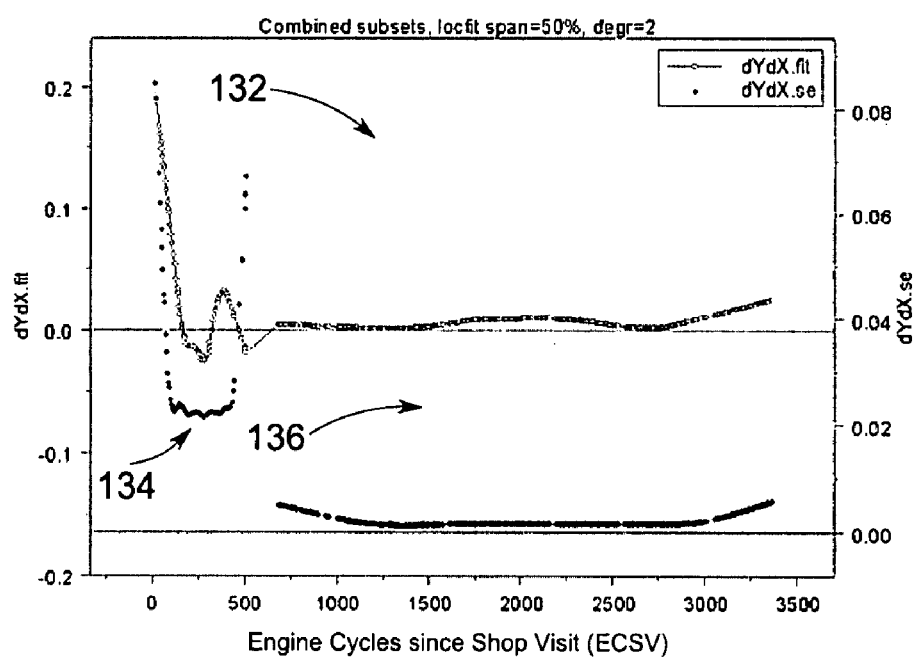
FIG. 12 is a graphical representation illustrating a segment fitted dY/dX fit in accordance with aspects of the present technique.

Referring back to FIG. 9, the segments are fitted at block 118 to estimate a slope fit (dY/dX fit) for each segment and to compute the error for each segment. Block 118 includes incorporating a high damping Loess regression to estimate the dY/dX fit, thereby determining the engine deterioration rate of the particular engine. In an exemplary embodiment, the high damping Loess regression fit is chosen to have a span of 50% and a degree of 2. In certain other exemplary embodiments, other suitable spans and degrees may be considered depending on the data. FIG. 12 is a graphical representation illustrating a segment fitted dY/dX fit 132 in accordance with aspects of the present technique. In the particular example, the fit 132 includes a short segment 134 and a long segment 136. As will be appreciated, slope estimates for short segments are more erratic than for long segments, due to sample size differences, and consequently the errors are also larger.

Figure 13:
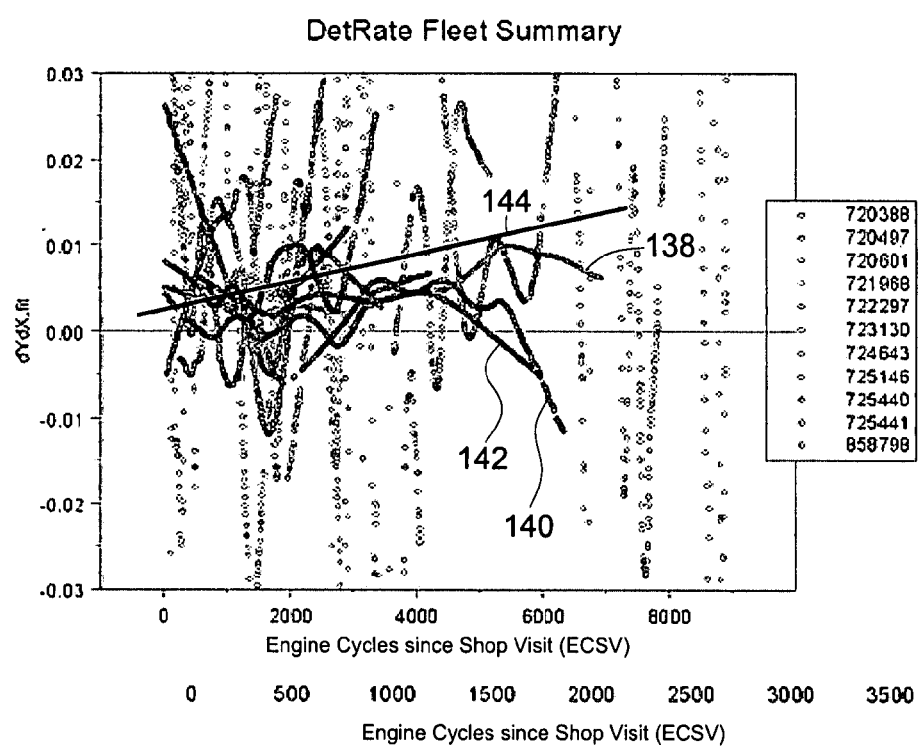
FIG. 13 is a graphical representation illustrating estimation of an average performance deterioration rate of a fleet of engines from slopes of EGT data from a plurality of engines.
Figure 14:
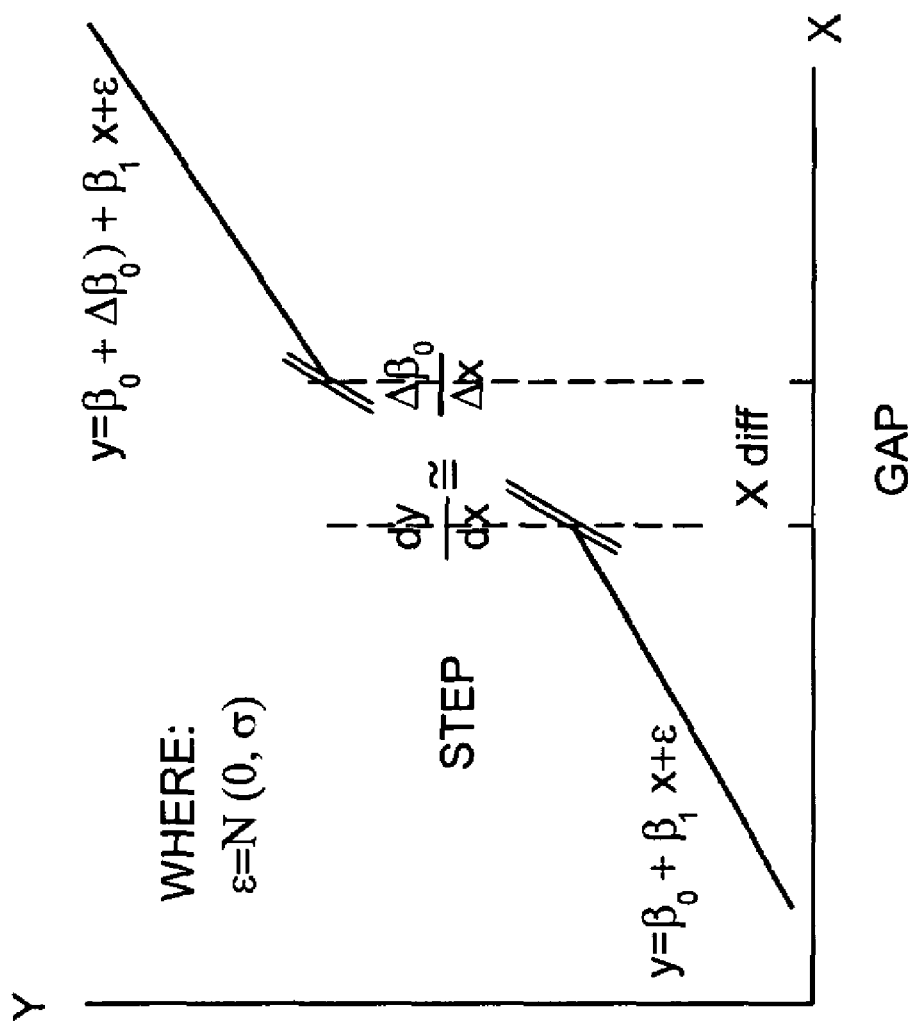
FIG. 14 is a graphical representation illustrating an X-range gap in accordance with aspects of the present technique.

According to aspects of the present technique, to combine single engine slope and slope error estimates to determine an average slope and error estimate of the fleet 26, a weighted regression may be incorporated. By setting the weight=1/error for each point, this method devalues estimates with large errors. The dY/dX·fit versus X is subsequently regressed using the set weights and a linear model. The resulting line is the average slope at each point. FIG. 13 illustrates an application of the above technique on EGT data obtained from a fleet comprising a plurality of engines. Traces 138, 140, and 142 represent exemplary slopes of individual engines. The average deterioration rate of the fleet is determined from the slope line 144 fitted by weighted regression techniques described above.

As mentioned earlier, if, after step detection, questionable data segments are removed manually, then the resulting dataset may have large X-range gaps. The above is explained with reference to FIG. 14. Suppose there exists a step of size $\Delta Y = \Delta \beta_0$, between two data segments with identical slope $\beta_1$, and if the step occurs between two successive data points, then the slope across the gap between these points is given by the following relationship:

$$dy/dx \approx \Delta Y/\Delta X = \Delta \beta_0 / \Delta X \quad (3)$$

The step detection technique illustrated above is configured to test this slope against a confidence interval of the average slope, to determine whether it is unusually large. That is, a step occurs in the dY/dX fit if one of the following conditions satisfied:

$dy/dx$<LCL=$dYdX$.avg−3*$dYdX$·err

Or $dy/dx$>UCL=$dYdX$.avg+3*$dYdX$.err

However, if for a fixed $\Delta \beta_0$, $\Delta X$ becomes large (i.e. there is an X-range gap) then this method may not detect the step. This condition occurs at the UCL of the step detection limits when one of the following conditions are satisfied:

$$\left[ \frac{dy}{dx} - \frac{\Delta \beta_0}{\Delta X} \right] \leq [UCL = dYdX.avg + 3*dYdX.err]$$

or $$\Delta X \geq \frac{\Delta \beta_0}{dYdX.avg + 3*dYdX.err}$$

Figure 15:
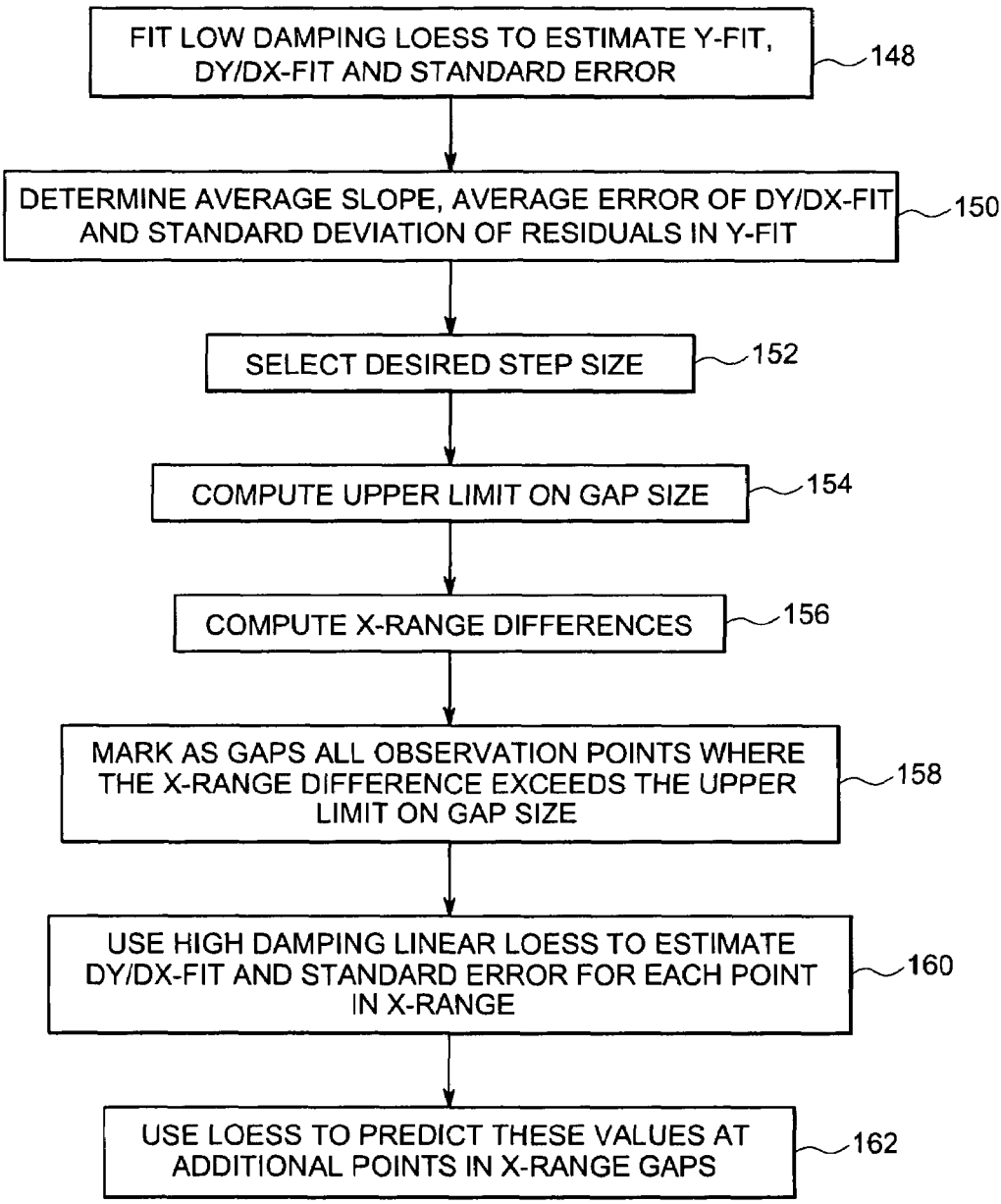
FIG. 15 is a flowchart illustrating an exemplary method for identification of X-range gaps in EGT data according to aspects of the present technique.

An X-range gap may be detected by determining whether an X-range gap is large or small using the above criterion. FIG. 15 is a flowchart illustrating an exemplary method 62 for identification of X-range gaps in EGT data according to aspects of the present technique. The method 64 begins by fitting a low damping Loess regression on EGT data to estimate a Y fit to estimate standard errors (dY/dX se) for each X value (block 148). An exemplary low damping Loess regression may incorporate a span of 5% and a degree of 1. In certain other exemplary embodiments, other suitable spans may be considered depending on the data. At block 150, an average slope and average error are estimated for the dY/dX fit and a standard deviation of residuals is determined for a Y fit (as described in block 82 of FIG. 5). Next at block 152, a desired step size ($\Delta\beta_0$) is selected. In one embodiment, the step size ($\Delta\beta_0$) may be equal to one standard error of the fit. In alternate embodiments, the step size may be determined by an apriori difference in the dependent variable Y (EGT in this example).

At block 154, an upper limit on gap size is computed. In the illustrated example, as explained above, the upper limit on gap size ($\Delta X_{UCL}$) is computed as $$\Delta X_{UCL} = \frac{\Delta\beta_0}{dYdX.avg + 3*dYdX.err} \quad (6)$$

where $\Delta\beta_0$ one standard error of the fit; dYdX avg is the average slope and dYdX err is the average error. Next at block 156, X-range gap ($Xdiff_i$) are computed as the difference of adjacent values in X as illustrated below.

$$Xdiff_i = X_i - X_{i-1} \quad (7)$$

wherein $X_i$ is the value of X at the "i" point and $X_{i-1}$ is the value of X at the "i-1" point.

Figure 16:
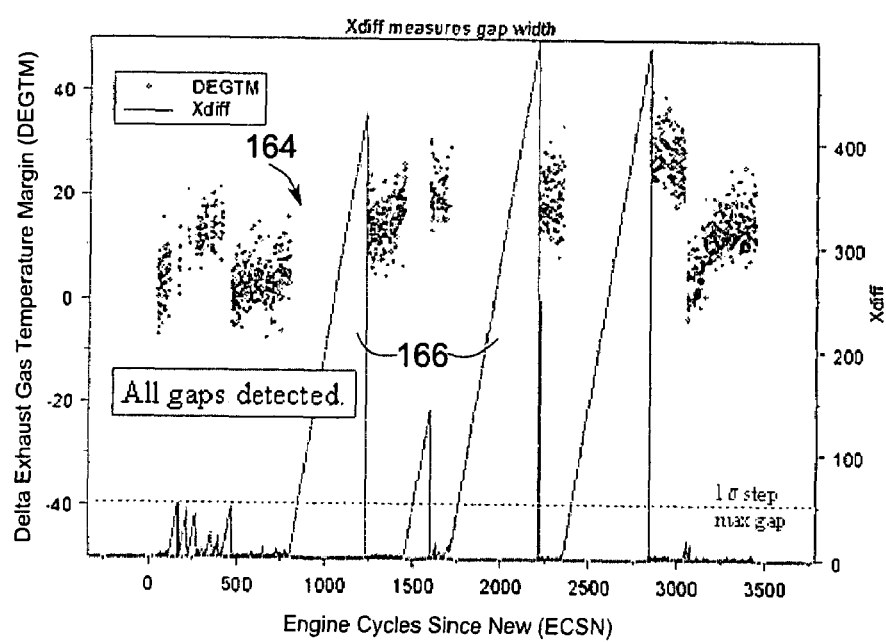
FIG. 16 is a graphical representation illustrating identification of X-range gaps in EGT data according to aspects of the present technique.

Gaps are identified at block 158 for all points i where the X-range gap exceeds the upper limit on the gap size, i.e. if Xdiff >$\Delta X_{UCL}$. FIG. 16 shows an exemplary EGT dataset 164 of a particular turbine engine illustrating X-range gaps 166 detected by the above technique.

Figure 17:
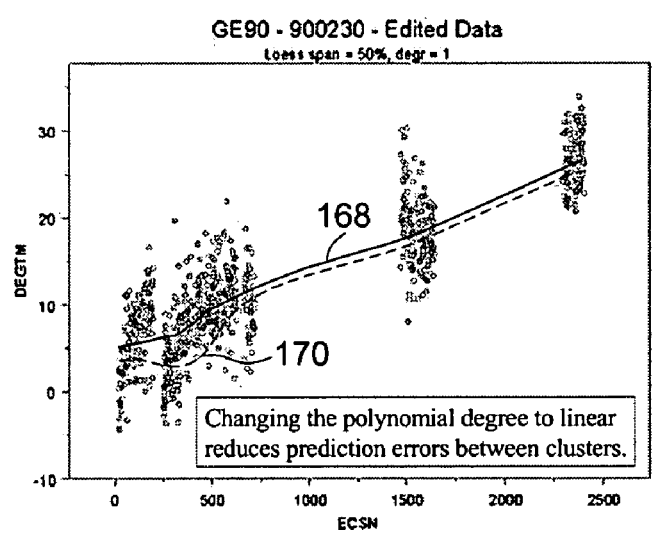
FIG. 17 is a graphical representation illustrating a linear degree Loess regression fit for identified gaps in EGT data.

Referring back to FIG. 15, the next step in the method 62 includes fitting of the identified X-range gaps (block 160). Block 160 incorporates a high damping linear Loess regression (i.e. degree=1) to estimate a slope (dY/dX) at each point X on the dataset. The high damping Loess regression may comprise, for example, a span of 50%. A linear regression is desirable in this scenario because a second degree polynomial may lack the desired stiffness, and may not properly predict the values between point clusters. However, some embodiments may utilize and benefit from a second or higher degree polynomial. The advantage of using linear degree Loess regression fit (represented by trace 168) over a second order Loess regression fit (represented by trace 170) for identified gaps in EGT data is illustrated in FIG. 17. The Loess model (span=50%, degree=2) fails with X-range gaps. The problem is that a second degree polynomial is too flexible, and does not properly predict the values between point clusters, whereas, a linear polynomial facilitates to properly predict the values between point clusters. Referring back to FIG. 15 the high damping Loess regression incorporated at block 160 is subsequently utilized to predict these values at additional points in the X-range gaps as represented by block 162.

The above described gap-fitting technique produces deterioration rate and deterioration rate error estimates, similar to the step fitting routine described above. The results of both step and gap fitting can be combined with each other, and step estimates, using the weighted regression technique to obtain average deterioration rate and deterioration rate error for the entire fleet as described above.

As will be appreciated, the above described techniques may take the form of computer or controller implemented processes and apparatuses for practicing those processes. Aspects of the present technique may also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The techniques described may further be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for monitoring engine performance, comprising:
   sampling exhaust gas temperature data associated with a turbine engine over an interval of operational time of the turbine engine;
   applying a first test to identify statistical outliers on the sampled exhaust gas temperature data;
   removing identified statistical outliers from the sampled exhaust gas temperature data;
   applying a second test to identify step changes in slope of the exhaust gas temperature data;
   dividing the interval of operational time into one or more segments based upon the identified step changes;
   determining a slope for each segment;
   combining the segments to obtain a rate of performance deterioration of the turbine engine; and
   outputting, storing, displaying, or a combination thereof, data related to the rate of performance deterioration.

2. The method of claim 1, comprising applying the first and second tests to exhaust gas temperature data obtained from a plurality of engines in a fleet and determining an average rate of performance deterioration for the fleet.

3. The method of claim 2, comprising applying a weighted regression fit to exhaust gas temperature data from the plurality of engines at each sampled point of operational time, wherein applying the weighted regression fit further comprises:
   determining a weight for each sampled point, wherein the weight at each sampled point is computed as an inverse of standard error for each sampled point, and wherein the standard error is in a slope fit at that point; and
   regression fitting the slope fit along the sampled points of operational time incorporating a linear model utilizing said weights.

4. The method of claim 1, further comprising applying a third test to identify one or more X-range gaps in the exhaust gas temperature data, fitting the identified one or more X-range gaps for estimating deterioration rate and deterioration error, and estimating an overall slope with gaps.

5. The method of claim 4, wherein applying a third test to identify one or more X-range gaps further comprises:

utilizing a Loess regression fit to obtain a trend line of slope of the sampled exhaust gas temperature data and determining a standard error at each sampled point of operational time;

computing an upper limit on gap size based upon a pre-selected step size and computed values of averaged standard error of the trend line and an average slope; and computing X-range differences at each sample point, and identifying a gap when the X-range difference at a point is greater than the upper limit on the gap size.

6. The method of claim 5, wherein the Loess regression fit comprises a low-damping Loess regression fit comprising a polynomial of degree 1 and having a span of less than or equal to about 5%.

7. The method of claim 5, wherein the preselected step size is computed as one standard deviation of the sampled exhaust gas temperature data relative to the trend line.

8. The method of claim 5, further comprising utilizing a high damping linear Loess regression fit to estimate slope and standard error at each point in the range of sampled points and using the Loess regression fit to predict slope and standard error at additional points in an identified X-range gap.

9. The method of claim 1, wherein applying the first test to identify statistical outliers further comprises:

applying a Loess regression fit to the sampled exhaust gas temperature data to obtain a trend line of exhaust gas temperature data;

computing residuals around the trend line, wherein residuals each comprise a difference between an actual data point of the sampled exhaust gas temperature data and a corresponding point on the trend line;

estimating a trimmed standard deviation of the residuals;

standardizing each of the residuals as a fraction of the trimmed standard deviation; and identifying as statistical outliers all points in which the modulus of the standard residual is greater than a selected value.

10. The method of claim 9, wherein the Loess regression fit comprises a low-damping Loess regression fit comprising a polynomial of degree 1 and having a span of less than or equal to about 5%.

11. The method of claim 9, wherein the trimmed standard deviation comprises standard deviation of the lowest 90% of the residuals.

12. The method of claim 1, wherein applying the second test to identify step changes in slope further comprises:

utilizing a Loess regression fit to obtain a trend line of slope of the sampled exhaust gas temperature data and determining a standard error between the sampled exhaust gas temperature data and the trend line;

computing an average value of the slope of the trend line and determining an average error (dY/dX·avg) of the trend line, wherein the average error is computed as an average of the standard error (dY/dX·se) at each sampled point;

determining a step-detector band having an upper band limit and a lower band limit;

determining step detection limits having an upper confidence limit and a lower confidence limit, wherein the upper confidence limit is computed as a sum of the upper band limit and a multiple of the average error, and the lower confidence limit is computed as a difference of the lower band limit and a multiple of the average error; and identifying a step change for all points in which the slope does not lie within the step detection limits.

13. The method of claim 12, wherein the Loess regression fit comprises a low-damping Loess regression fit comprising a polynomial of degree 1 and having a span of less than or equal to about 5%.

14. The method of claim 12, wherein the upper band limit is computed as UBL=2*(dY/dX·avg) and the lower band limit is computed as LBL=0.5*(dY/dX·avg).

15. The method of claim 12, further comprising applying a high damping Loess regression fit for each segment and determining performance deterioration rate and an error of performance deterioration rate fit for each segment, wherein the performance deterioration rate at any point is computed as the value of the slope at that point and the error in performance deterioration at any point is computed directly from the standard error at that point.

16. The method of claim 15, wherein applying the high-damping Loess regression fit comprises fitting a polynomial of degree 2 and having a span of less than or equal to about 50%.

17. A method for monitoring engine performance, comprising:

identifying and eliminating any statistical outliers and step changes from exhaust gas temperature data of individual turbine engines;

identifying any X-range gaps in the exhaust gas temperature data of individual turbine engines to segment the exhaust gas temperature data;

obtaining a rate of change of exhaust gas temperature for each turbine engine after identifying and eliminating any statistical outliers and step changes and identifying any X-range gaps;

combining the rates of change of exhaust gas temperature of individual turbine engines to determine an average rate of change of exhaust gas temperature of a fleet including a plurality of turbine engines; and outputting, storing, displaying, or a combination thereof, data related to the average rate of change of exhaust gas temperature.

18. The method of claim 17, comprising applying a weighted regression fit to exhaust gas temperature data from the plurality of turbine engines at each sampled point of operational time, wherein applying the weighted regression fit further comprises:

determining a weight for each sampled point, wherein the weight at each sampled point is computed as weight=1/(dY/dX·se) for each sampled point and wherein dY/dX·se represents a standard error in a slope fit (dY/dX·fit) at that point; and regression fitting the slope fit (dY/dX·fit) along the sampled points of operational time incorporating a linear model utilizing said weights.

19. A method for monitoring engine performance, comprising:

sampling exhaust gas temperature data associated with a turbine engine over an interval of operational time of the turbine engine;

applying a first test to identify statistical outliers on the sampled exhaust gas temperature data;

removing identified statistical outliers from the sampled exhaust gas temperature data;

applying a second test to identify step changes in slope of the exhaust gas temperature data;

dividing the interval of operational time into one or more segments based upon the identified step changes;

determining a slope for each segment;

combining the segments to obtain a rate of performance deterioration of the turbine engine; and outputting a notice, a command, or a combination thereof, associated with the rate of performance deterioration to a display, a control, or a combination thereof, of a system having the turbine engine.

20. A method for monitoring engine performance, comprising:

identifying and eliminating any statistical outliers and step changes from exhaust gas temperature data of individual turbine engines;

identifying any X-range gaps in the exhaust gas temperature data of individual turbine engines to segment the exhaust gas temperature data;

obtaining a rate of change of exhaust gas temperature for each turbine engine after identifying and eliminating any statistical outliers and step changes and identifying any X-range gaps;

combining the rates of change of exhaust gas temperature of individual turbine engines to determine an average rate of change of exhaust gas temperature of a fleet including a plurality of turbine engines; and outputting a notice, a command, or a combination thereof, associated with the average rate of change of exhaust gas temperature to a display, a control, or a combination thereof, of a system having the individual turbine engines.

21. A method for monitoring engine performance, comprising:

identifying and eliminating any statistical outliers and step changes from exhaust gas temperature data of individual turbine engines;

identifying any X-range gaps in the exhaust gas temperature data of individual turbine engines to segment the exhaust gas temperature data;

obtaining a rate of change of exhaust gas temperature for each turbine engine after identifying and eliminating any statistical outliers and step changes and identifying any X-range gaps;

combining the rates of change of exhaust gas temperature of individual turbine engines to determine an average rate of change of exhaust gas temperature of a fleet including a plurality of turbine engines; and controlling downtime of the individual turbine engines based at least in part on the average rate of change of exhaust gas temperature.

* * * * *